(12) United States Patent
Brown et al.

(10) Patent No.: US 11,162,534 B1
(45) Date of Patent: Nov. 2, 2021

(54) MULTIPLE ROW THRUST BEARINGS

(71) Applicant: Schaeffler Technologies AG & Co. KG, Herzogenaurach (DE)

(72) Inventors: James Kevin Brown, Rock Hill, SC (US); Alicia Vidal Ortiz, Puebla (MX); Benjamin Kanda, Hamtramck, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/861,416

(22) Filed: Apr. 29, 2020

(51) Int. Cl.
*F16C 19/30* (2006.01)
*F16C 33/48* (2006.01)

(52) U.S. Cl.
CPC .......... *F16C 33/485* (2013.01); *F16C 19/305* (2013.01); *F16C 2226/74* (2013.01)

(58) Field of Classification Search
CPC ........ F16C 19/30; F16C 19/305; F16C 33/48; F16C 33/485; F16C 2226/74
See application file for complete search history.

(56) References Cited

U.S. PATENT DOCUMENTS

| | | | | |
|---|---|---|---|---|
| 2,117,633 A | * | 5/1938 | Smith | F16C 19/30 384/623 |
| 2,539,683 A | * | 1/1951 | Ablett | F16C 19/30 384/608 |
| 3,328,098 A | * | 6/1967 | Budzich | F16C 33/48 384/608 |
| 6,843,605 B2 | | 1/2005 | Tamada et al. | |
| 7,134,794 B2 | * | 11/2006 | Obayashi | F16C 19/30 384/623 |
| 8,177,438 B2 | * | 5/2012 | Waseda | F16C 33/565 384/621 |
| 2006/0088237 A1 | | 4/2006 | Yamamoto et al. | |

FOREIGN PATENT DOCUMENTS

| | | | | |
|---|---|---|---|---|
| DE | 102015201487 A1 | * | 4/2016 | ............. F16C 43/04 |
| JP | 2000240645 A | * | 9/2000 | .......... F16C 33/4664 |
| JP | 2017036831 A | * | 2/2017 | ............. F16C 33/48 |

* cited by examiner

*Primary Examiner* — Phillip A Johnson
(74) *Attorney, Agent, or Firm* — Volpe Koenig

(57) ABSTRACT

A thrust bearing having an inner cage having inner cage pockets, with inner rollers in the inner cage pockets, and a first outer cage having a larger diameter than the inner cage and having first outer cage pockets, with first outer rollers in the first outer cage pockets. The inner cage and the first outer cage are axially and radially aligned. A radially extending rim is provided on one circumferential side of one of the inner cage or the first outer cage that faces a facing circumferential side of the other of the inner cage or the first outer cage. First and second radially extending side tabs are provided on the facing circumferential side of the other of the inner cage or the first outer cage that define a circumferentially extending channel therebetween that receives the radially extending rim to connect the cages together.

19 Claims, 5 Drawing Sheets

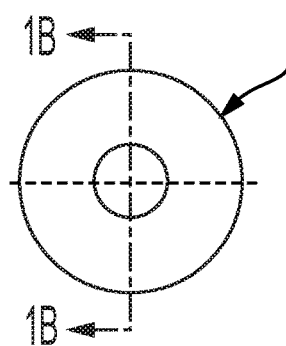
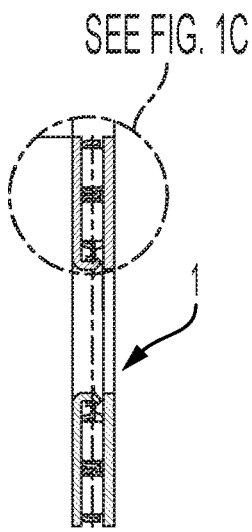
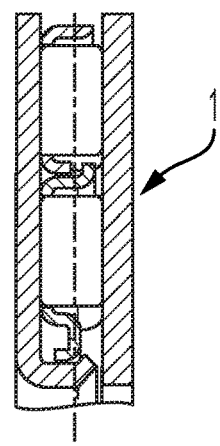
FIG. 1A
PRIOR ART
FIG. 1B
PRIOR ART
FIG. 1C
PRIOR ART
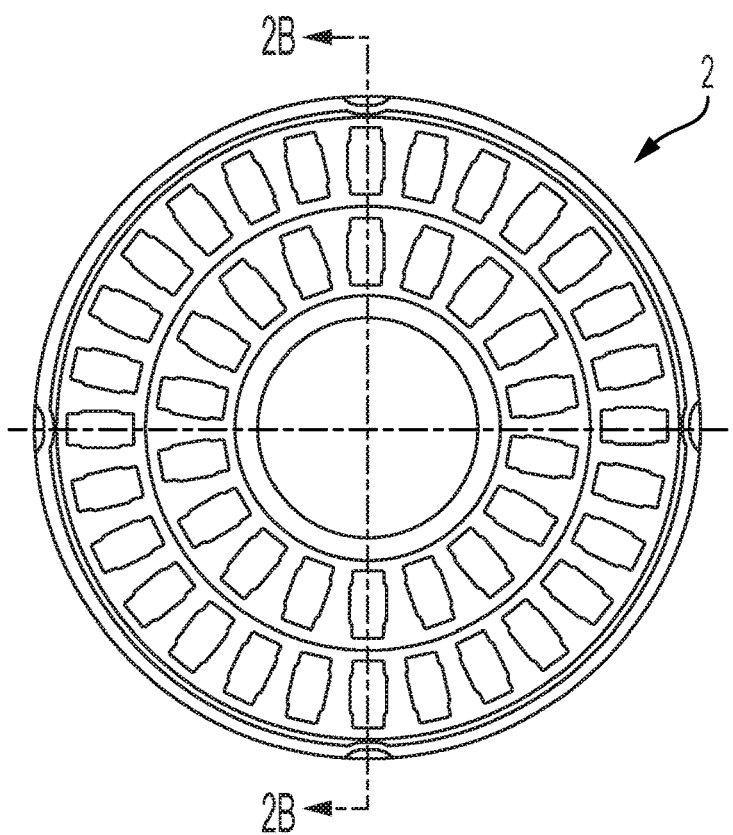
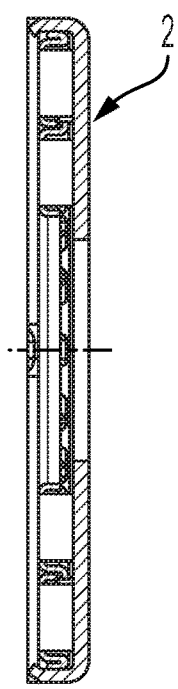
FIG. 2A
PRIOR ART
FIG. 2B
PRIOR ART

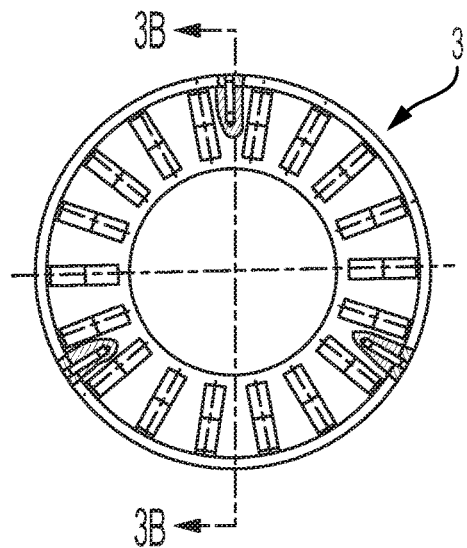
FIG. 3A
PRIOR ART
FIG. 3B
PRIOR ART
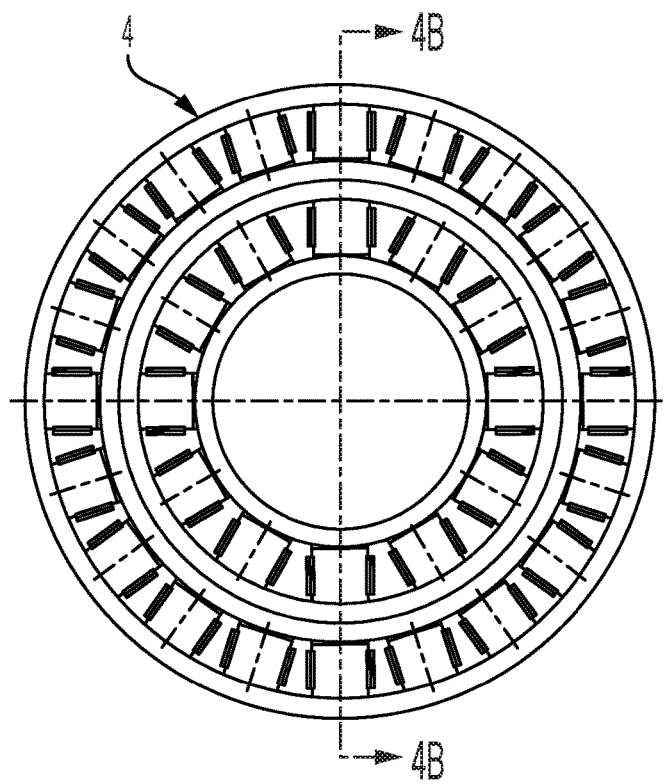
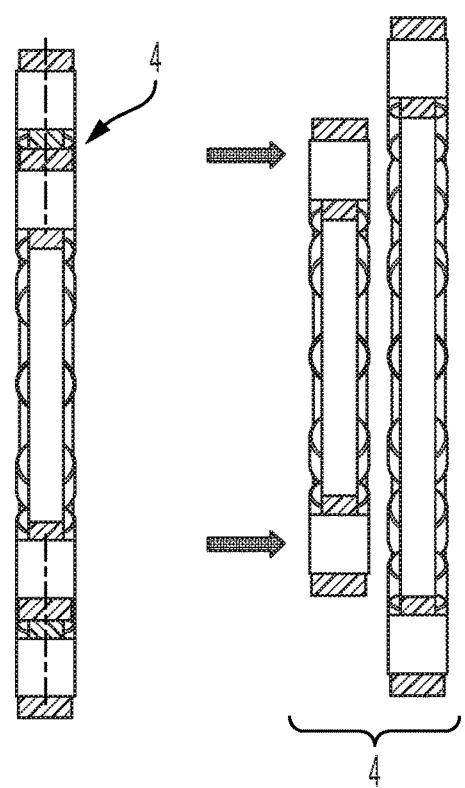
FIG. 4A
PRIOR ART
FIG. 4B
PRIOR ART
FIG. 4C
PRIOR ART

MULTIPLE ROW THRUST BEARINGS

FIELD OF INVENTION

The present disclosure relates to thrust bearings, and more particularly to thrust needle roller bearings.

BACKGROUND

Encapsulated multiple row thrust bearings 1, 2 with two or more stamped steel cages are known, as shown in FIGS. 1A-1C and 2A-2B. These arrangements utilize stamped sheet metal cages that require proper cage orientation during assembly. Improper orientation could cause damage during assembly and allow for a missing cage and roller unit.

FIGS. 3A-3B show another known prior art thrust bearing 3. This includes a single cage with two rollers within each cage pocket. However, this arrangement does not allow for an increased number of rollers in the second row, which limits the bearing's load carrying capacity FIG. 4 shows another multiple row thrust bearing 4 where the rows formed by separate cages with rollers are not unitized or encapsulated, and instead are provided as separate units. Here, the end user must be sure to assemble both bearings into the end use assembly. If one cage assembly is forgotten, then there is a risk to the load carrying capacity.

It would be desirable to provide an improved thrust bearing that addresses the issues with the known prior art. It would also be desirable to provide a thrust bearing arrangement in a compact and simple manner while still providing for cost savings.

SUMMARY

The present disclosure provides a thrust bearing comprising having an inner cage having inner cage pockets, with inner rollers in the inner cage pockets, and a first outer cage having a larger diameter than the inner cage and having first outer cage pockets, with first outer rollers in the first outer cage pockets. The inner cage and the first outer cage are axially and radially aligned. A radially extending rim is provided on one circumferential side of one of the inner cage or the first outer cage that faces a facing circumferential side of the other of the inner cage or the first outer cage. First and second radially extending side tabs are provided on the facing circumferential side of the other of the inner cage or the first outer cage that define a circumferentially extending channel therebetween that receives the radially extending rim.

This arrangement allows for a multiple row thrust bearing that eliminates the need for cage orientation during assembly, allows for more rollers to be added to the larger diameter outer rows for increased load carrying capacity, allows for unitized assembly of multiple rows, which can preferably be "snapped" together to act as one unit, while also allowing for independent motion between cages.

In one embodiment, the first and second radially extending side tabs are resilient and are configured for a snap fit over the rim.

The inner cage is rotatable relative to the first outer cage with the rim sliding in a circumferential direction in the circumferentially extending channel.

In one arrangement, at least one of the first or second radially extending side tabs extends continuously 360°.

In one arrangement, there is a plurality of the first radially extending side tabs with circumferential spaces located therebetween. Preferably, there is also a plurality of the second radially extending side tabs with circumferential spaces located therebetween. The first radially extending side tabs can be circumferentially offset from the second radially extending side tabs.

In one embodiment, the radially extending rim is located on the circumferential side of the inner cage, and the first and second radially extending side tabs are located on the facing circumferential side of the first outer cage.

In one embodiment, the radially extending rim is formed from a plurality of ring segments that are separated by gaps through which at least one of the first radially extending side tabs or the second radially extending side tabs are snapped through.

In one embodiment, there is an outer rim on a radially outer circumferential side of the first outer cage, and a washer having a radially extending race located on one axial side of the inner cage and the first outer cage on which the rollers run, and an axially extending flange extending from a radially outer side of the washer having retention tabs that engage over the outer rim. This allows for pre-assembly of the thrust bearing with a washer that forms one of the races.

In one arrangement, at least one of the inner cage or the first outer cage is formed of a resilient material.

In one arrangement, at least one of the inner cage or the first outer cage is molded from a polymeric material.

In one embodiment, a number of the first outer cage pockets is greater than a number of the inner cage pockets.

In one embodiment, a second outer cage is provided having a larger diameter than the first outer cage and having second outer cage pockets. Second outer rollers are located in the second outer cage pockets. The inner cage, the first outer cage, and the second outer cage are axially and radially aligned. A second radially extending rim is provided on one circumferential side of one of the first outer cage or the second outer cage that faces a facing circumferential side of the other of the first outer cage or the second outer cage. Third and fourth radially extending side tabs are provided on the facing circumferential side of the other of the first outer cage or the second outer cage that define a second circumferentially extending channel therebetween that receives the second radially extending rim.

Further outer cages with further rows of further rollers can be assembled in a like manner for scalability of the present thrust bearing design.

In one arrangement, the third and fourth radially extending side tabs are resilient and are configured for a snap fit over the rim.

The first outer cage is rotatable relative to the second outer cage with the second rim sliding in a circumferential direction in the second circumferentially extending channel.

In one arrangement, at least one of the third or fourth radially extending side tabs extends continuously 360°.

In one embodiment, there is a plurality of the third radially extending side tabs with circumferential spaces located therebetween. Preferably, there is also a plurality of the fourth radially extending side tabs with circumferential spaces located therebetween. The third radially extending side tabs can be circumferentially offset from the fourth radially extending side tabs.

In one arrangement, the second radially extending rim is located on the circumferential side of the first outer cage, and the third and fourth radially extending side tabs are located on the facing circumferential side of the second outer cage.

One or more of the above features can be used separately or together.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIGS. 1-1C are, respectively, a plan view, a cross-sectional view, and an enlarged portion of the cross-sectional view of a first prior art thrust bearing.

FIGS. 2A and 2B are, respectively, a plan view and a cross-sectional view of a second prior art thrust bearing.

FIGS. 3A and 3B are, respectively, a plan view and a cross-sectional view of prior art thrust bearing.

FIGS. 4A-4C are, respectively, a plan view, a cross-sectional view, and a cross-sectional view showing assembly of two separate cage/roller assemblies of a fourth prior art thrust bearing.

DETAILED DESCRIPTION

Figure 5A:
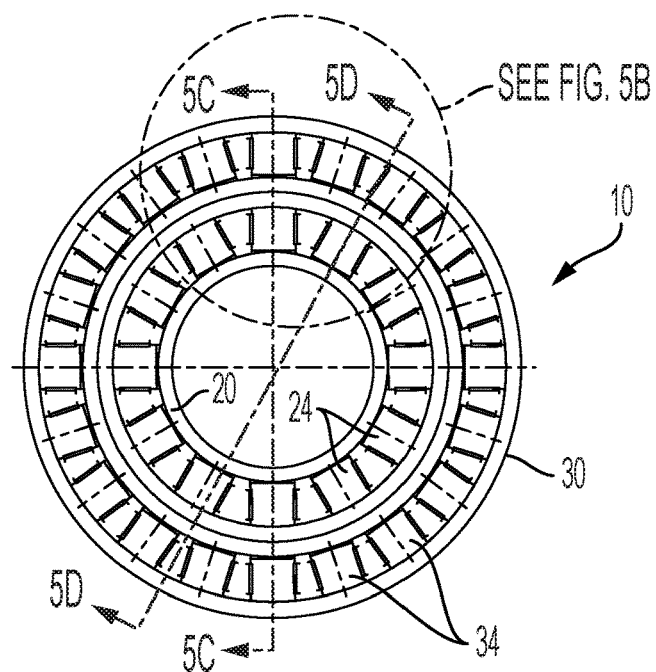
FIG. 5A is a plan view of a first embodiment of a thrust bearing.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 5B:
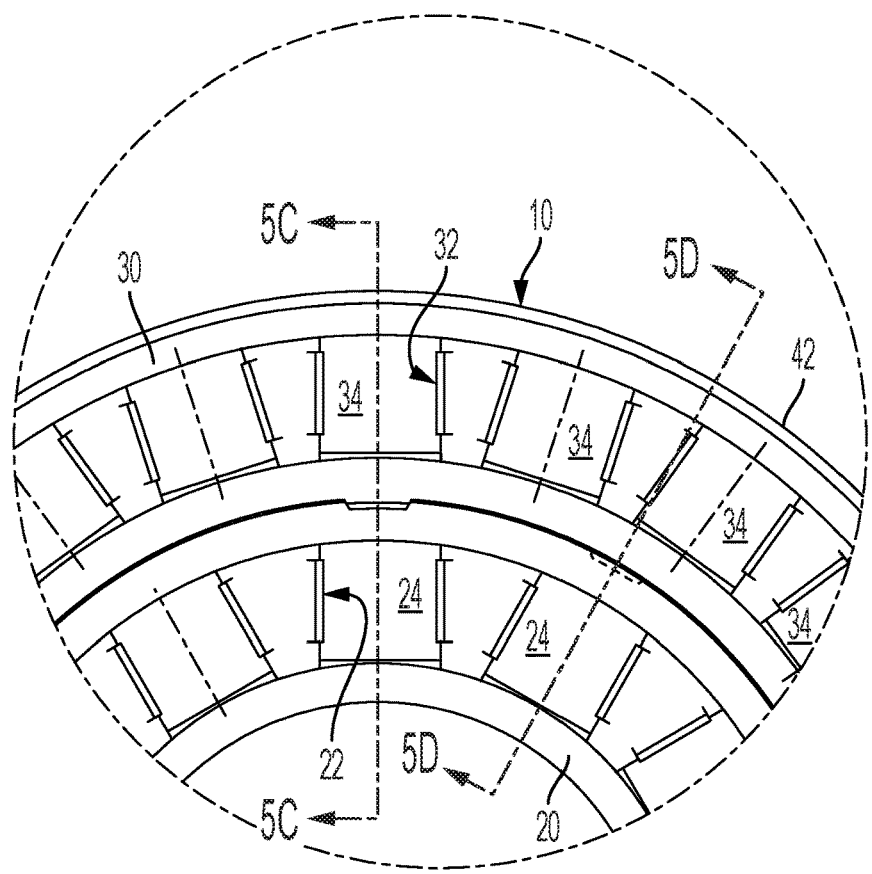
FIG. 5B is an enlarged detail showing a portion of the thrust bearing of FIG. 5A.
Figure 5C:
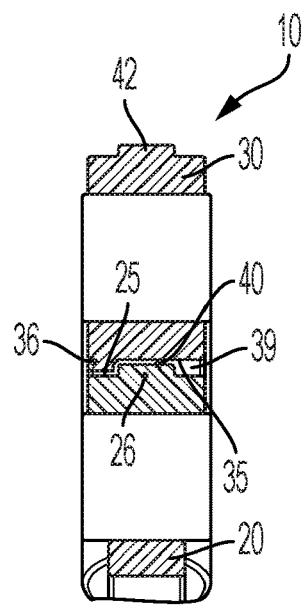
FIG. 5C is a cross-sectional view taken along line 5C-5C in FIG. 5B.

Referring now to FIGS. 5A-5C, a first embodiment of a thrust bearing 10 is shown. Thrust bearing 10 includes an inner cage 20 having inner cage pockets 22, best shown in FIG. 5b, with rollers 24 located in the inner cage pockets 22. A first outer cage 30 is provided having a larger diameter than the first inner cage 20 and having first outer cage pockets 32, with first outer rollers 34 being located in the first outer cage pockets 32. Here the inner cage 20 and the outer cage 30 are axially and radially aligned.

In order to provide for improved assembly, the cages are configured to "snap" into one another so that they are held together in a unitized manner. As shown in detail in FIGS. 5C and 5D, a radially extending rim 26 is provided on one circumferential side 25 of one of the inner cage 20 or the first outer cage 30, preferably the inner cage 20 as shown, and faces a facing circumferential side 35 of the other of the inner cage 20 or the first outer cage 30, preferably, the facing circumferential side 35 of the first outer cage 30. The radially extending rim 26 is preferably centrally located and is spaced inwardly from the first and second axial sides of the inner cage 20.

Figure 5D:
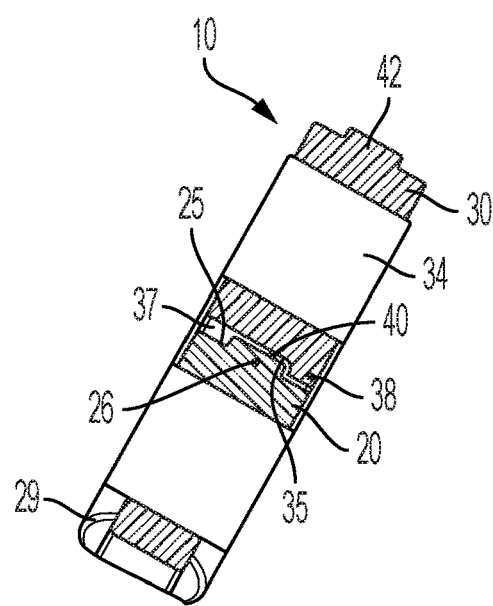
FIG. 5D is a cross-sectional view taken along line 5D-5D in FIG. 5B.

Still with reference to FIGS. 5C and 5D, first and second radially extending side tabs 36, 38 are located on the facing circumferential side 35 of the other of the inner cage 20 or the first outer cage 30, preferably the first outer cage 30, that define a circumferentially extending channel 40 therebetween that receives the radially extending rim 26. As shown in detail in FIGS. 5A and 5B, these first and second radially extending side tabs 36, 38 include circumferential spaces therebetween indicated at 37 in FIG. 5d between the first radially extending side tabs 36, and indicated at 39 in FIG. 5C for the second radially extending side tabs 38.

The first and second radially extending side tabs 36, 38 are preferably formed of a resilient material and are configured to snap fit over the rim 26.

Any number of the first and second radially extending side tabs 36, 38 can be used. In one embodiment, there are eight of the first radially extending side tabs 36 and eight of the second radially extending side tabs 38 that are spaced apart in the circumferential direction. Preferably the first and second radially extending side tabs 36, 38 are also offset from one another in the circumferential direction.

The present arrangement allows the inner cage 20 to be rotatable relative to the first outer cage 30, with the rim 26 sliding in the circumferential direction in the circumferentially extending channel 40. Preferably, clearances are provided that are at least about 0.05 mm between the radially extending rim 26 and the facing portions of the facing circumferential side 35 of the first outer cage 30 and the inwardly facing portions of the first and second radially extending side tabs 36, 38.

In a preferred arrangement, at least one of the inner cage 20 or the first outer cage 30 are formed of a resilient material. More preferably, at least one of the inner cage 20 or the first outer cage 30 is molded from a polymeric material such as in an injection molding process. The material can be polyester or any other suitable polymer. However, those skilled in the art will understand that the cages 20, 30 could be machined or stamped from a variety of materials.

As shown in FIG. 5A, a number of the first outer cage pockets 32 is greater than a number of the first inner cage pockets 22. However, they can be equal if desired.

Figure 6:
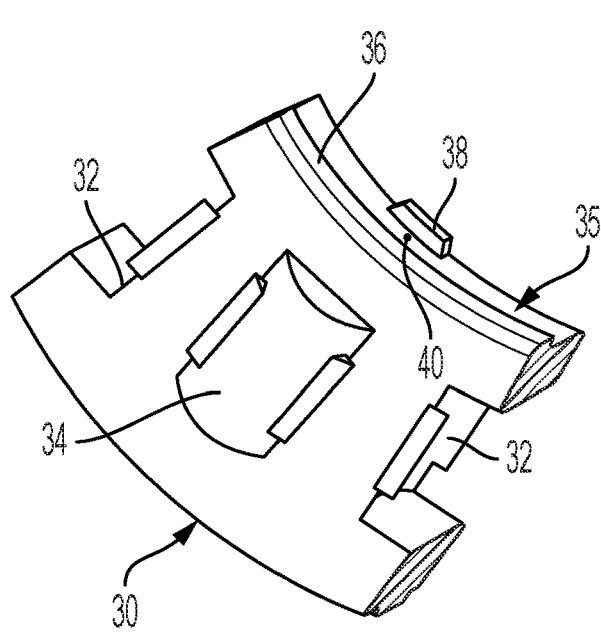
FIG. 6 is a partial perspective view of an outer cage showing an alternative configuration of the first and second radially extending side tabs.

Referring now to FIG. 6, an alternate configuration of the side tabs 36, 38 is shown. Here, at least one of the first or second radially extending side tabs 36, 38, and preferably the first radially extending side tab 36, extends continuously 360°. While only a single one of the radially extending side tabs 36 is shown as extending continuously, the other side tab 38 could also extend continuously.

Figure 8:
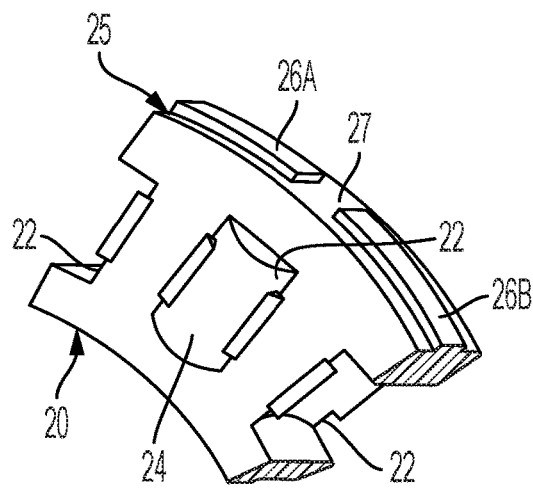
FIG. 8 is a partial perspective view of an inner cage showing an alternate configuration of the radially extending rim as a plurality of ring segments.

An alternate configuration of the radially extending rim is shown in FIG. 8 where here a plurality of ring segments 26A, 26B etc. are shown that are separated by gaps 27. The number of gaps 27 are preferably arranged to be aligned with at least one of the first radially extending side tabs 36, or the second radially extending side tabs 38, which can then be snapped through these gaps 27. Those skilled in the art will recognize that the number of ring segments 26A, 26B, etc. as well as the number of gaps 27 can be adjusted to match up with various numbers of first and second radially extending side tabs 36, 38, depending upon the particular size and configuration of the thrust bearing 10.

Figure 7:
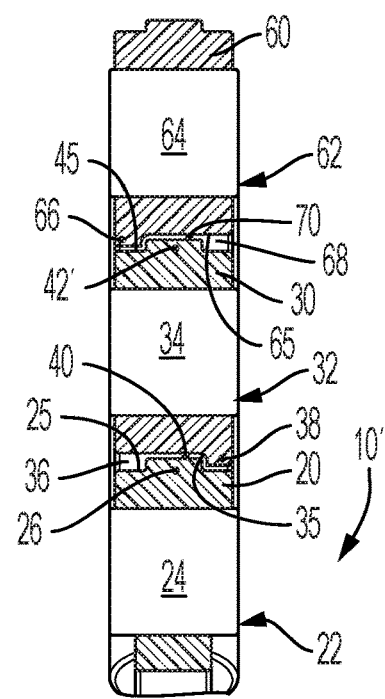
FIG. 7 is a cross-section view similar to FIG. 5C showing an alternate embodiment of the thrust bearing having three cage-roller assemblies which are connected to one another in a self-retain manner.

Referring now to FIG. 7, an alternate embodiment of the thrust bearing 10' is shown. In FIG. 7, a cross section similar to FIG. 5C is provided of the thrust bearing 10' which, in addition to the inner cage 20 assembled with the inner rollers 24 and the first outer cage 30 assembled with the first outer rollers 34, includes a second outer cage 60 which has a larger diameter than the first outer cage 30 and also includes second outer cage pockets 62 in which second outer rollers 64 are located. Here the inner cage 20, the first outer cage 30, and the second outer cage 60 are axially and radially aligned. A second radially extending rim 42' is located on one circumferential side 45 of one of the first outer cage 30 or the second outer cage 60, preferably the first outer cage 30, and faces a facing circumferential side 65 of the other of the first outer cage 30 or the second outer cage 60, preferably of the second outer cage 60. Third and fourth radially extending side tabs 66, 68, similar to the first and radially extending side tabs 36, 38 discussed above, are provided on the facing circumferential side 65 of the other of the first outer cage 30 or the second outer cage 60, preferably the second outer cage 60, that define a second circumferentially extending channel 70 therebetween that receives the second radially extending rim 42'.

The third and fourth radially extending side tabs 66, 68 are resilient and are configured for a snap fit over the second radially extending rim 42'. This arrangement allows the first outer cage 30 to be rotatable relative to the second outer cage 60 with the second radially extending rim 42' sliding in a circumferential direction in the second circumferentially extending channel 70.

As discussed above and shown in FIG. 6, in connection with the first and second radially extending side tabs 36, 38, at least one of the third or fourth radially extending side tabs, 66, 68 could also extend continuously 360°. However, as shown above in FIGS. 5A and 5B, preferably there is a plurality of the third radially extending side tabs 66 with circumferential spaces located therebetween and there is also a plurality of the fourth radially extending side tab 68 with circumferential spaces located therebetween. These radially extending side tabs 66, 68 can be spaced apart or continuous similar to the radially extending side tabs 36, 38. These side tabs 66, 68 are arranged to allow for a snap fit over the second radially extending rim 42'.

It is also possible for the second radially extending rim 42' to be configured as a plurality of ring segments similar to ring segments 26A and 26B shown in FIG. 8.

This arrangement can be applied to multiple rows of cages with each larger cage having more rollers than the one or more respective inwardly located cages in order to take advantage of the larger circumference, and therefore increase the load carrying capability of the entire assembled unit.

Figure 9A:
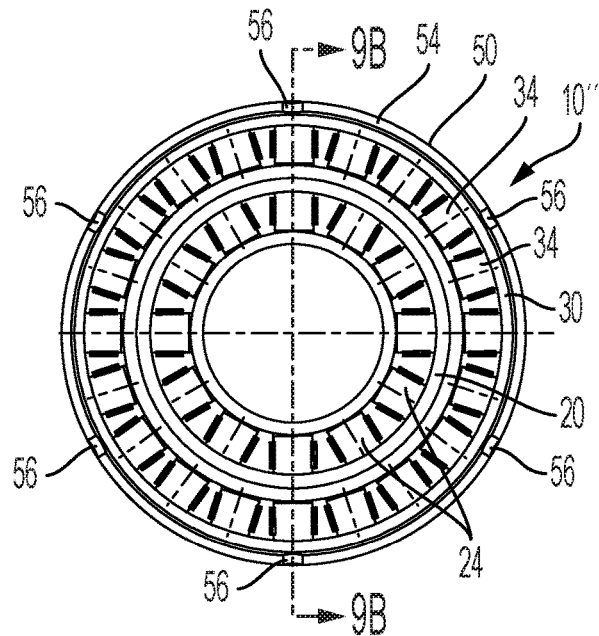
FIG. 9A is a plan view of a further embodiment of the thrust bearing shown assembled with a washer that forms one radially extending race which includes a flange that allows the washer to be assembled with the cage-roller assemblies.
Figure 9B:
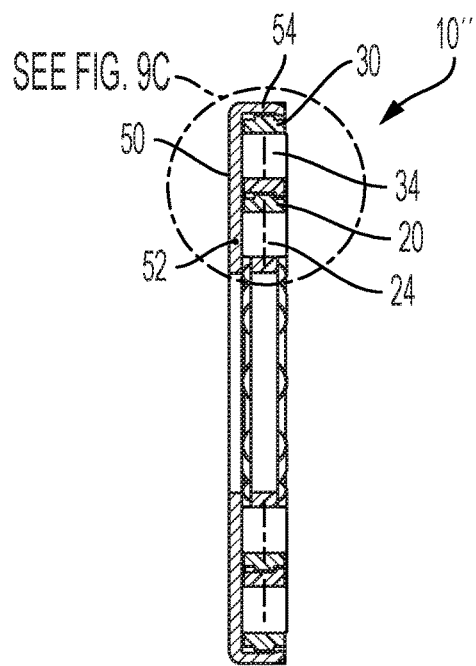
FIG. 9B is a cross-sectional view taken along line 9B-9B of the thrust bearing shown in FIG. 9A.
Figure 9C:
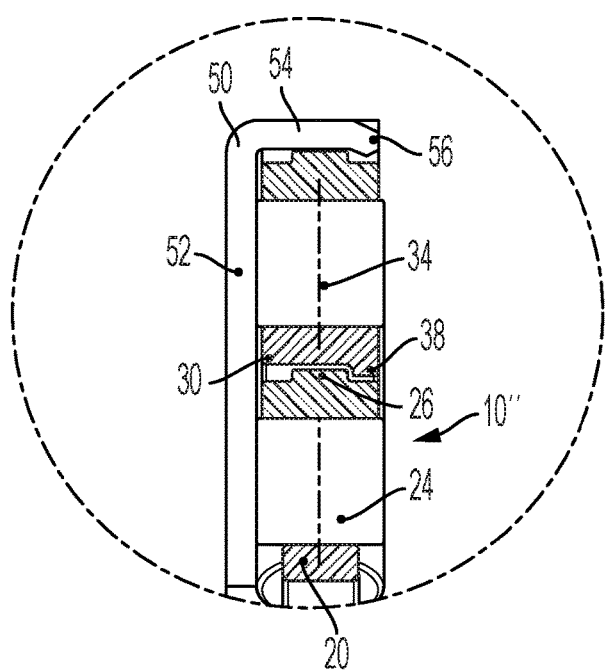
FIG. 9C is an enlarged detail showing a portion of the thrust bearing of FIG. 9A.

Referring now to FIGS. 9A-9C, another embodiment 10" of a thrust bearing is shown. This embodiment of the thrust bearing 10" is identical to the first embodiment of the thrust bearing 10 discussed above; however, in addition to the cage-roller assemblies 20, 24; 30, 34, it further includes an outer rim 42 on a radially outer circumferential side 43 of the first outer cage 30 which is adapted to allow assembly with one or more washers. Here, a washer 50 having a radially extending flange with a race 52 is provided that is located on one axial side of the inner cage 20 and the first outer cage 30. The rollers 24, 34 are adapted to run on this radially extending race 52. An axially extending flange 54 extends from a radially outer side of the washer 50 and includes retention tabs 56 that engage over the outer rim 42 in order to retain the washer 50 with the cage-roller assemblies 20, 24; 30, 34 in a pre-assembled manner. This provides for unitized assembly of multiple rows with the race in a simple and cost effective manner.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiments and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

1 Prior art thrust bearing
2 Prior art thrust bearing
3 Prior art thrust bearing
4 Prior art thrust bearing
10, 10', 10" Thrust bearing
20 Inner cage
22 Inner cage pockets
24 Inner rollers
25 One circumferential side
26 Radially extending rim
26A Ring segment
26B Ring segment
27 Gaps
28 Radially extending rim
30 First outer cage
32 First outer cage pockets
34 Outer rollers
35 Facing circumferential side
36 First radially extending side tab
37 Circumferential spaces
38 Second radially extending side tab
39 Circumferential spaces
40 Circumferentially extending channel
42 Second radially extending rim
43 Radially outer circumferential side
45 Circumferential side
50 Washer
52 Radially extending race
54 Axially extending flange
56 Retention tabs
60 Second outer cage
62 Second outer cage pockets
64 Second outer rollers 65 Facing circumferential side
66 Third radially extending side tabs
68 Fourth radially extending side tabs
70 Second circumferentially extending channel

What is claimed is:

1. A thrust bearing comprising:
an inner cage having inner cage pockets;
inner rollers in the inner cage pockets;
a first outer cage having a larger diameter than the inner cage and having first outer cage pockets;
first outer rollers in the first outer cage pockets;
wherein the inner cage and the first outer cage are axially and radially aligned;
a radially extending rim on one circumferential side of one of the inner cage or the first outer cage that faces a facing circumferential side of the other of the inner cage or the first outer cage; and
at least one first radially extending side tab and at least one second radially extending side tab on the facing circumferential side of the other of the inner cage or the first outer cage that define a circumferentially extending channel therebetween that receives the radially extending rim.

2. The thrust bearing of claim 1, wherein the first radially extending side tab and the second radially extending side tab are resilient and are configured for a snap fit over the rim.

3. The thrust bearing of claim 1, wherein the inner cage is rotatable relative to the first outer cage with the rim sliding in a circumferential direction in the circumferentially extending channel.

4. The thrust bearing of claim 1, wherein at least one of the first radially extending side tab or the second radially extending side tab extends continuously 360°.

5. The thrust bearing of claim 1, wherein there is a plurality of the first radially extending side tab with circumferential spaces located therebetween.

6. The thrust bearing of claim 5, wherein there is a plurality of the second radially extending side tab with circumferential spaces located therebetween.

7. The thrust bearing of claim 1, wherein the radially extending rim is located on the circumferential side of the inner cage, and the first radially extending side tab and the second radially extending side tab are located on the facing circumferential side of the first outer cage.

8. The thrust bearing of claim 1, wherein the radially extending rim is formed from a plurality of ring segments that are separated by gaps through which at least one of the first radially extending side tab or the second radially extending side tab are snapped through.

9. The thrust bearing of claim 1, further comprising an outer rim on a radially outer circumferential side of the first outer cage, and a washer having a radially extending race located on one axial side of the inner cage and the first outer cage on which the rollers run, and an axially extending flange extending from a radially outer side of the washer having retention tabs that engage over the outer rim.

10. The thrust bearing of claim 1, wherein at least one of the inner cage or the first outer cage are formed of a resilient material.

11. The thrust bearing of claim 1, wherein at least one of the inner cage or the first outer cage are molded from a polymeric material.

12. The thrust bearing of claim 1, wherein a number of the first outer cage pockets is greater than a number of the inner cage pockets.

13. The thrust bearing of claim 1, further comprising:
a second outer cage having a larger diameter than the first outer cage and having second outer cage pockets;
second outer rollers in the second outer cage pockets;
wherein the inner cage, the first outer cage, and the second outer cage are axially and radially aligned;
a second radially extending rim on one circumferential side of one of the first outer cage or the second outer cage that faces a facing circumferential side of the other of the first outer cage or the second outer cage; and
at least one third radially extending side tab and at least one fourth radially extending side tab on the facing circumferential side of the other of the first outer cage or the second outer cage that define a second circumferentially extending channel therebetween that receives the second radially extending rim.

14. The thrust bearing of claim 13, wherein the third radially extending side tab and the fourth radially extending side tab are resilient and are configured for a snap fit over the second radially extending rim.

15. The thrust bearing of claim 13, wherein the first outer cage is rotatable relative to the second outer cage with the second radially extending rim sliding in the circumferential direction in the second circumferentially extending channel.

16. The thrust bearing of claim 13, wherein at least one of the third radially extending side tab or the fourth radially extending side tab extends continuously 360°.

17. The thrust bearing of claim 13, wherein there is a plurality of the third radially extending side tab with circumferential spaces located therebetween.

18. The thrust bearing of claim 17, wherein there is a plurality of the fourth radially extending side tab with circumferential spaces located therebetween.

19. The thrust bearing of claim 13, wherein the second radially extending rim is located on the circumferential side of the first outer cage, and the third radially extending side tab and the fourth radially extending side tab are located on the facing circumferential side of the second outer cage.

* * * * *